United States Patent [19]

Kurosawa

[11] Patent Number: 4,924,392
[45] Date of Patent: May 8, 1990

[54] ACTIVE SUSPENSION FOR A VEHICLE COORDINATELY RESPONSIVE TO CENTRIFUGAL FORCE DUE TO TURNING AND SIDE WIND

[75] Inventor: Ryuichi Kurosawa, Numazu, Japan

[73] Assignee: Toyota Jidosha Kabushiki Kaisha, Aichi, Japan

[21] Appl. No.: 207,514

[22] Filed: Jun. 16, 1988

[30] Foreign Application Priority Data

Jun. 23, 1987 [JP] Japan .................................. 62-156261

[51] Int. Cl.$^5$ .............................................. B60G 17/00
[52] U.S. Cl. ................................ 364/424.05; 280/707; 280/840
[58] Field of Search .................... 364/424.05; 280/703, 280/707, 840, DIG. 1

[56] References Cited

U.S. PATENT DOCUMENTS

| 4,712,807 | 12/1987 | Kurosawa | 364/424.05 |
| 4,761,022 | 8/1988 | Ohashi et al. | 280/707 |
| 4,821,191 | 4/1989 | Ikemoto et al. | 280/707 |

*Primary Examiner*—Gary Chin
*Attorney, Agent, or Firm*—Oliff & Berridge

[57] ABSTRACT

A suspension system for a vehicle adapted to support the body of the vehicle from wheels via servo actuators each supporting the body from a corresponding wheel, wherein the force provided by each actuator is controlled to support the body against rolling based upon a coordination of the acceleration acting to the body in lateral directions of the vehicle and the roll angle acceleration acting to the body in rolling directions, both accelerations being due to turn running of the vehicle along a curved route and/or side wind blowing.

5 Claims, 2 Drawing Sheets

ACTIVE SUSPENSION FOR A VEHICLE COORDINATELY RESPONSIVE TO CENTRIFUGAL FORCE DUE TO TURNING AND SIDE WIND

BACKGROUND OF THE INVENTION

1. Field of the Invention

The present invention relates to a suspension for a vehicle such as an automobile, and more particularly, to an active suspension for a vehicle adapted to operate coordinately in response to the centripetal force exerted to the vehicle body due to turning of the vehicle and a side force exerted to the vehicle body by a side wind.

2. Description of the Prior Art

Because of the flexibility required for the suspension of the vehicle, when the vehicle is turning the vehicle body makes a rolling around its center of rolling due to the torque and consisting of a couple of the centrifugal force acting through the center of gravity of the vehicle body and the corresponding centripetal force acting at the wheels from the road surface. Further, when a side wind blows against the vehicle, the vehicle body also makes a rolling around the center of rolling, because in the vehicles like automobiles the center of rolling is located at a relatively low position and therefore the total vector of the force applied by a side wind passes much above the center of rolling.

Although the control for suppressing the rolling of the vehicle body is to be based upon the roll angle acceleration applied to the vehicle body by turning of the vehicle and/or side wind blowing, considering that the rolling due to turning can be infallibly precisely forecast by detecting the lateral acceleration due to the centrifugal force, and noting that the relationship between the directions of the lateral acceleration and the roll angle acceleration due to turning is reversed from that due to a side wind, the present inventor once proposed to detect the lateral acceleration and the roll angle accelerating acting to the vehicle body by respective sensors, to discriminate the relative directions of the lateral acceleration and the roll angle acceleration thereby to know which of the turning and the side wind blowing is dominating to cause the rolling of the vehicle body, and to operate a plurality of suspension actuators so as to act against the force for rolling the vehicle body based upon the lateral acceleration when the turning is dominating, while operating the suspension actuators based upon the roll angle acceleration when the side wind blowing is dominating (Japanese Patent Application 21525/85, laid open as Publication 181715/86).

Thereafter, the present inventor further noted that a more improved steering performance is available if the degree of operation of the suspension actuators for the front wheels and that for the rear wheels can be differently distributed according to whether they are operated based upon the lateral acceleration or the roll angle acceleration, and proposed to operate the suspension actuators for the front and the rear wheels at a first distribution ratio of degree of operation such as Nf vs. Nr when they are operated according to the lateral acceleration, while operating the suspension actuators for the front and the rear wheels at a second distribution ratio of degree of operation such as Nf' vs. Nr' when they are operated according to the roll angle acceleration (Japanese Patent Application 295943/85; U.S. Pat. No. 4,712,807; European Patent Application 86101461).

However, in these former proposes the suspension actuators are still operated based upon only the lateral acceleration or the roll angle acceleration according to which of the turning or the side wind blowing is dominating, and therefore, when the effect of the turning on the rolling of the vehicle body is substantial but is overcome by that of the side wind blowing in the above-mentioned process of discriminating the directions of the accelerations, the merit of operating the suspension actuators based upon the lateral acceleration for the anti-rolling control is totally lost.

SUMMARY OF THE INVENTION

Therefore, the object of the present invention is to provide an active suspension fundamentally of the type as formerly proposed but improved to operate always based upon a coordination of the lateral acceleration and the roll angle acceleration in suppressing the rolling of the vehicle body.

According to the present invention, the above-mentioned object is accomplished by:

a suspension system for a vehicle comprising a vehicle body and a plurality of wheels, comprising:

a plurality of actuators, each of which supports said vehicle body from a corresponding one of said wheels and is controllable to provide a variable force between said vehicle body and said corresponding wheel;

a sensor means for detecting acceleration a of said vehicle body in lateral directions thereof and for producing a signal representative thereof;

a sensor means for detecting roll angle acceleration r of said vehicle body and for producing a signal representative thereof;

a control means for inputting said signals representative of said lateral acceleration and said roll angle acceleration of said vehicle body from said sensor means, for calculating based thereupon fluctuation Fs of the load acting between said vehicle body and said wheels due to turning of the vehicle and fluctuation Fw of the load acting between said vehicle body and said wheels due to a side wind blown against the vehicle according to:

$$Fs = K_1 a + K_2 r$$

$$Fw = -K_3 a + K_4 r$$

($K_1$, $K_2$, $K_3$ and $K_4$ being positive constants) and for controlling said actuators to increase or decrease forces provided thereby between said vehicle body and said actuators according to the sum of said fluctuations Fs and Fw.

Denoting the lateral direction acceleration detected by the lateral direction acceleration sensor by a, the roll angle acceleration detected by the roll angle acceleration sensor by r, the lateral direction acceleration and the roll angle acceleration due to vehicle turning by $a_s$ and $r_s$, respectively, the lateral direction acceleration and the roll angle acceleration due to a side wind by $a_w$ and $r_w$, respectively, and defining that the positive direction of the lateral acceleration and the roll angle acceleration is leftward and clockwise, respectively, as viewed from the rear of the vehicle, then a and r may be expressed as follows:

$$a = a_s + a_w \tag{1}$$

$$r = r_s + r_w \tag{2}$$

Further, denoting the roll moment of the vehicle body due to turning by Ms and the roll moment of the vehicle body due to a side wind by Mw, and defining that the positive direction of the moments is clockwise as viewed from the rear of the vehicle, these moments may be regarded to be in a proportionality relationship to the lateral direction acceleration, and therefore may be expressed as follows:

$$Ms = k_1 a_s \tag{3}$$

$$Mw = -k_2 a_w \tag{4}$$

($k_1$ and $k_2$ being positive constants).

Since these roll moments can also be regarded to be in a proportionality relationship with the roll angle acceleration, they may also be expressed respectively as follows:

$$Ms = k_3 r_s \tag{5}$$

$$Mw = k_4 r_w \tag{6}$$

($k_3$ and $k_4$ being positive constant).

Substituting equations (3) to (6) into equations (1) and (2), equations (1) and (2) can be respectively rewritten as follows:

$$a = (1/k_1)Ms - (1/k_2)Mw \tag{7}$$

$$r = (1/k_3)Ms + (1/k_4)Mw \tag{8}$$

Eliminating either Mw or Ms from equations (7) and (8) we obtain:

$$Ms = \{(1/k_4)a + (1/k_2)r\}/\{(1/k_2 k_3) + (1/k_1 k_4)\} \tag{9}$$

$$Mw = \{-(1/k_3)a + (1/k_1)r\}/\{(1/k_2 k_3) + (1/k_1 k_4)\} \tag{10}$$

It will be seen from equations (9) and (10) that both the roll moment Ms of the vehicle body due to turning and the roll moment Mw of the vehicle body due to a side wind can be derived from the lateral direction acceleration a and the roll angle acceleration r.

Since the dynamic load Fs due to turning and the dynamic load Fw due to a side wind are proportional to the moments Ms and Mw, they can be expressed as follows:

$$Fs = k_5 Ms$$

$$Fw = k_6 Mw$$

($k_5$ and $k_6$ being positive constants).

Substituting equations (9) and (10) into these equations, they can be represented as follows:

$$Fs = k_5\{(1/k_4)a + (1/k_2)r\}/\{(1/k_2 k_3) + (1/k_1 k_4)\}$$

$$Fw = -k_6\{(1/k_3)a - (1/k_1)r\}/\{(1/k_2 k_3) + (1/k_1 k_4)\}.$$

Replacing the coefficients of a and r in these equations by $K_1$, $K_2$, $K_3$ and $K_4$, respectively, the equations can be rewritten as follows:

$$Fs = K_1 a + K_2 r \tag{11}$$

$$Fw = -K_3 a + K_4 r \tag{12}$$

Therefore, by setting up the constants $K_1$ to $K_4$ appropriately, the dynamic load or load fluctuation Fs due to turning and the dynamic load or load fluctuation Fw due to a side wind can be derived from the coordination of the lateral dirction acceleration a and the roll angle acceleration r. Therefore, by controlling the suspension actuators according to the sum of Fs and Fw the vehicle body is always controlled against the rolling to meet with the effects of the turning and the side wind.

Based upon such a basic concept of the invention, as a further modification of the present invention it is desirable that said control means controls a pair of front wheels in said plurality of wheels according to the sum of Nf part of said fluctuation Fs and Nf' part of said fluctuation Fw and a pair of rear wheels in said plurality of wheels according to the sum of Nr part of said fluctuation Fs and Nr' part of said fluctuation Fw, wherein Nf plus Nr is 1.00, and Nf' plus Nr' is 1.00.

Further, the suspension system according to the present invention may also comprise a sensor for detecting acceleration of said body in longitudinal directions thereof and for producing a signal representative thereof, wherein said control means further inputs said signal representative of said longitudinal acceleration and controls said actuators further to increase or alternatively decrease the forces provided thereby between said body and a pair of front wheels in said plurality of wheels and to decrease or alternatively increase the forces provided thereby between said body and a pair of rear wheels in said plurality of wheels, respectively.

Further, the control of increasing or decreasing the forces provided by the suspension actuators may desirably be performed in the well known feedback manner so that the force provided by each actuator is balanced with the actual force detected by a load sensor as acting between the vehicle body and the corresponding actuator.

BRIEF DESCRIPTION OF THE DRAWINGS

In the accompanying drawings.

DESCRIPTION OF THE PREFERRED EMBODIMENT

In the following, with reference to the accompanying drawings, the present invention will be described in more detail in terms of an embodiment.

Figure 1:
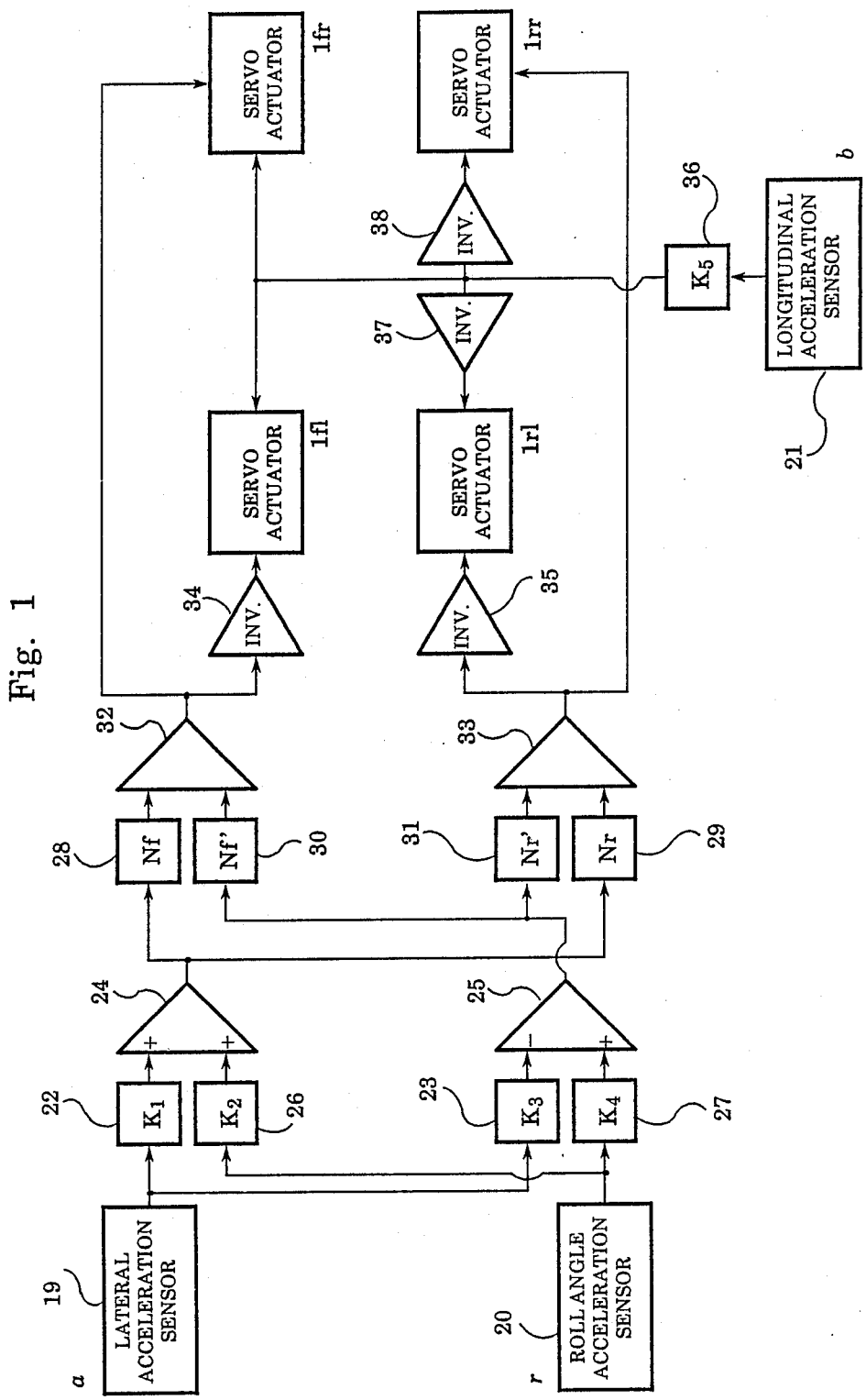
FIG. 1 is a block diagram showing an embodiment of the active suspension according to the present invention applied to a four wheel automobile.
Figure 2:
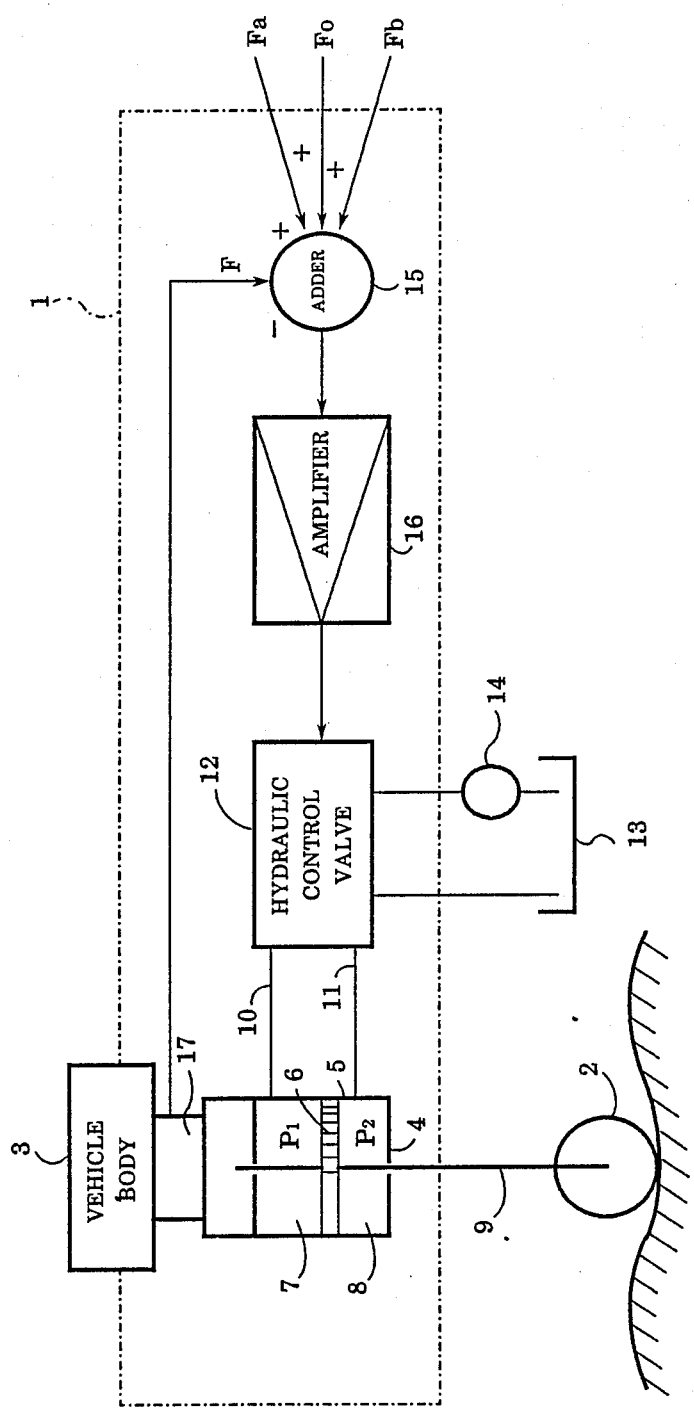
FIG. 2 is a schematic structural diagram showing a servo device provided for each vehicle wheel.

First referring to FIG. 2, 1 indicates a servo device, and as indicated in FIG. 1 by 1fl, 1fr, 1rl and 1rr, four of these servo devices are provided corresponding respectively to a front left wheel, a front right wheel, a rear left wheel and a rear right wheel of the automobile. Each servo device 1 is provided between a vehicle wheel 2 and a vehicle body 3, and has an actuator 4 which supports the vehicle body with respect to the corresponding vehicle wheel.

The actuator 4 comprises a cylinder 5 and a piston 6 inserted into and movable relative to the cylinder in substantially vertical direction only. The cylinder 5 and the piston 6 cooperate to outline an upper chamber 7 and a lower chamber 8. A rod 9 is fixed to the piston 6, and extends through the end wall at both ends of the cylinder 5, and therefore even when the piston reciprocates within the cylinder, the volume of the rod within the cylinder does not change. The rod 9 supports at its lower end a vehicle wheel 2 which is rotatable about an axis extending substantially in the lateral direction of the vehicle.

The upper chamber 7 and the lower chamber 8 are communicated by lines 10 and 11 respectively to an electromagnetic type hydraulic servo valve 12. The hydraulic servo valve 12 is of a construction in itself well known, and is constantly and continuously supplied with a high pressure operating fluid produced by a hydraulic pressure generating device 14 such as a pump which draws up operating fluid stored in a reservoir 13, and after having passed through an internal variable orifice incorporated in the hydraulic servo valve 12 but not shown, the operating fluid is returned to the reservoir 13. By controlling the flow rate of the operating fluid through the variable orifice, the pressure within the upper chamber 7 and lower chamber 8 are controlled to be $P_1$ and $P_2$ ($P_1 > P_2$), respectively, and therefore the pressure difference ($P_1 - P_2$) between the pressure in the upper chamber 7 and the pressure in the lower chamber 8 can be controlled to be an arbitrary value.

In the embodiment shown in the drawings, the hydraulic servo valve 12 of each servo device is controlled by control signals (voltage signals) inputted through an adder 15 and an amplifier 16. When the voltage of the control signal inputted from the amplifier 16 is zero, the pressure difference ($P_1 - P_2$) of each actuator 4 of the servo devices 1fl, 1fr, 1rl or 1rr is maintained at a respective constant value so that the force expressed by the product ($P_1 - P_2$)A of the pressure difference ($P_1 - P_2$) and the sectional area A of the piston 6 is equal to the load component of the vehicle body 3 to be supported by the particular wheel 2. When the voltage of the control signal inputted to the amplifier 16 is either positive or negative, the pressure difference ($P_1 - P_2$) is increased or decreased according to the absolute value of that voltage.

Between the vehicle body 3 and each actuator 4 there is provided a load sensor 17 which detects the actual load acting between the vehicle body 3 and each wheel 2, i.e. the force exerted by the actuator 4 and outputs a voltage signal F corresponding to this force toward a minus terminal of the adder 15.

It should be noted that the actuator 4 may be constructed so that the rod 9 extends to pass through the end wall of the cylinder 5 only at the lower end in the drawing. In this case, when the piston 6 reciprocates, the volume of the rod 9 within the cylinder changes. When the area of the upper surface of the piston is $A_1$ and the area of the lower end of the piston is $A_2$, the hydraulic servo valve 12 needs to be constructed to change the pressure $P_1$ in the upper chamber 7 and the pressure $P_2$ in the lower chamber 8 according to the control signals from the amplifier 16 in such a way that the force produced $A_1P_1 - A_2P_2$ is controlled. Further, the rod 9 of the actuator 4 may be connected to the vehicle body 3 while the cylinder 5 may be connected to the vehicle wheel 2. The reservoir 13 and the hydraulic pressure generation device 14 may be shared by all of the servo devices, and the operating fluid may be any fluid not necessarily oil, provided only that it is a substantially incompressible fluid.

In FIG. 1, 19, 20 and 21 are respectively a lateral direction acceleration sensor, a roll angle acceleration sensor and a longitudinal direction acceleration sensor provided in the vehicle body. These sensors detect respectively the lateral direction acceleration, the roll angle acceleration and the longitudinal direction acceleration acting to the vehicle body, and output signals a, r and b indicating these accelerations. In particular, in the shown embodiment, the sensor 19 outputs a signal a which is positive or negative respectively when the direction of the acceleration is leftward or rightward as viewed from the rear of the vehicle, the sensor 20 outputs a signal r which is positive or negative respectively when the direction of the acceleration is clockwise or anti-clockwise as viewed from the rear of the vehicle, and the sensor 21 outputs a signal b which is negative or positive respectively when the acceleration direction is forward or rearward of the vehicle. The absolute values of the voltages of these signals correspond to the magnitude of the accelerations.

The signal from the lateral direction acceleration sensor 19 is multiplied by factors $K_1$ and $K_3$ by amplifiers 22 and 23, respectively, and thereafter is supplied individually to a positive terminal of an adder 24 and a negative terminal of an adder 25. Similarly the signal from the roll angle acceleration sensor 20 is multiplied by factors $K_2$ and $K_4$ by amplifiers 26 and 27, respectively, and thereafter is supplied individually to positive terminals of adders 24 and 25. The output ($K_1a + K_2r$) of the adder 24 is inputted to amplifiers 28 and 29, and the output ($-K_3a + K_4r$) of the adder 25 is inputted to amplifiers 30 and 31.

The amplifiers 28 and 29 cooperate to multiply the output signal from the adder 24 in a voltage ratio Nf:Nr (Nf>0, Nr>0, Nf+Nr=1), and output signals ($K_1a + K_2r$)Nf and ($K_1a + K_2r$)Nr respectively to adders 32 and 33. Similarly the amplifiers 30 and 31 cooperate to multiply the output signal from the adder 25 in a voltage ratio Nf':Nr' (Nf'>0, Nr'>0, Nf'+Nr'=1), and output signals ($-K_3a + K_4r$)Nf' and ($-K_3a + K_4r$)Nr' respectively to the adders 32 and 33.

The adder 32 sends its output signal to the servo device 1fr and also through a sign inverter 34 to the servo device 1fl. The adder 33 sends its output signal to the servo device 1rr and through a sign inverter 35 to the servo device 1rl.

The output signal from the longitudinal direction acceleration sensor 21 is multiplied in voltage by a factor $K_5$ by an amplifier 36, and thereafter is inputted to the servo devices 1fl and 1fr, and also through sign inverters 37 and 38 respectively to the servo devices 1rl and 1rr.

As described hereinunder, the amplifiers 22, 23, 26 and 27, the adders 24 and 25, the amplifiers 28, 29, 30 and 31, the adders 32 and 33, the sign inverters 34 and 35, the amplifier 36, the sign inverters 37 and 38, and the adder 15 and the amplifier 16 of each servo device form a calculation control device which calculates the fluctuation in the load acting between the vehicle body and each wheel due to acceleration of the vehicle body based upon the output signals from the various sensors, performs a distribution calculation between the front and rear wheels at a cerain ratio on the results of these calculations, and outputs control signals to the hydraulic servo valves 12. This calculation control device may be constructed in an analog fashion as in the embodiment shown in the drawing, or may be constructed as a digital device. Moreover, the amplifying ratios $K_1$, $K_2$, $K_3$, $K_4$ and $K_5$ (positive constants) of the amplifiers 22, 23, 26, 27 and 36 may be determined for example by calculations or experiments.

As shown in FIG. 2, the adder 15 of each servo device 1 has three plus input terminals and one minus input terminal. The plus input terminals are supplied with the output signal Fa from the adder 32 or 33, the output signal Fb from the amplifier 36, and a voltage signal Fo supplied from a setter or the like not shown in the figure and corresponding to the component of the load of the vehicle body 3 to be supported by the corresponding wheel 2 under the condition that the vehicle is in the stationary state or the vehicle is undergoing constant speed straight line motion. The minus terminal is supplied with the output signal F from the load sensor 17 indicating the actual load acting between the vehicle body 3 and the corresponding vehicle wheel 2.

Therefore, the difference $(P_1-P_2)$ between the pressure $P_1$ in the upper chamber 7 and the pressure $P_2$ in the lower chamber 8 of the actuator 4 is increased or decreased by the hydraulic servo valve 12 based upon the signals Fa and Fb, and feedback control is carried out on the signal $Fa+Fb+fo-F$ so that: $F=Fa+Fb+Fo$ Moreover, when the active suspension of the present invention is implemented with open loop control, the load sensors 17 and the input device for the signal Fo may be omitted.

Now, the operation of the embodiment constructed as described above will be described hereinunder.

First, when the vehicle is stationary or is undergoing constant speed straight line motion, the acceleration of the vehicle body in all directions is zero, and therefore the outputs from the sensors 19, 20 and 21 are 0, and $F=Fo$, and accordingly the output of the adder 15 is zero, and therefore the pressure difference $(P_1-P_2)$ of the actuator 4 of each servo device 1fl, 1fr, 1rl or 1rr is maintained at respective constant values, so that the vehicle body is maintained in a particular attitude. Then, when the vehicle is travelling in constant speed straight line motion, if a wheel 2 passes over an unevenness in the road surface, the force acting on the vehicle wheel from the road surface will fluctuate, but in this case the pressure difference $(P_1-P_2)$ of each actuator 4 will be maintained constant, and therefore the force supported between the wheel and the vehicle body by each actuator will be maintained constant. According to such a vertical displacement of each wheel the piston 6 of the corresponding actuator will be displaced vertically relative to the cylinder 5, but the vehicle body will not be displaced vertically and the attitude of the vehicle body will be maintained in a particular predetermined state.

When the vehicle is turning, a centrifugal force acts in the vehicle body toward outside of the turn, while the vehicle body is exerted with a corresponding centripetal force from the road through the suspension in the direction opposite to the direction of the centrifugal force, and since the center of gravity of the vehicle body is generally above the center of rolling of the vehicle body, the vehicle body will roll toward the outside of the turn under a centrifugal acceleration while being retained toward the inside of the turn by the corresponding centripetal acceleration. The magnitudes of the lateral direction acceleration and the roll angle acceleration under this turning condition detected by the sensors 19 and 20 are substantially proportional to one another. When the lateral direction acceleration due to the centripetal force is directed leftward, the roll angular acceleration is directed clockwise as viewed from the rear of the vehicle, and vice versa when the vehicle is turning to the right, and therefore, they are always of the same positive/negative sign according to the afore-mentioned definition.

On the other hand, when the vehicle is subjected to a side wind blowing leftward as viewed from the rear of the vehicle, the vehicle body is urged leftward by a leftwardly directed lateral acceleration and an anticlockwise roll angle acceleration also as viewed from the rear of the vehicle, and vice versa when the wind is blowing from left to right of the vehicle. Therefore, they are always of the opposite positive/negative sign according to the afore-mentioned definition.

Therefore, when the vehicle is turning, i.e. a and r are both positive or both negative, the magnitude of $Fs(=K_1a+K_2r)$ is relatively large while the magnitude of $Fw(=-K_3a+K_4r)$ is relatively small, and therefore, the operation of the actuators is principally governed by Fs but also by Fw.

On the other hand, when the vehicle is subjected to a side wind, i.e. a and r are positive and negative or negative and positive, respectively, the magnitude of $Fs(=K_1a+K_2r)$ is relatively small while the magnitude of $Fw(=-K_3a+K_4r)$ is relatively large, and therefore, the operation of the actuators is principally governed by Fw but also by Fs.

Here, by setting up the distribution ratio of the signals between the amplifiers 28 and 29 appropriately, any desired steering characteristics can be obtained while the vehicle is turning. If $Nf=Nr=0.5$ is the setting, the fluctuation in the load acting between the vehicle body and the wheels due to the centrifugal force acting on the vehicle body is distributed evenly between the front and rear wheels, and as a result the influence of turning on the steering characteristics will be neutral. If Nf is set to be greater than Nr, the fluctuation in said load is greater on the front wheels than on the rear wheels, and as a result the influence of turning on the steering characteristics will be understeering. If on the contrary Nf is set to be less than Nr, the fluctuation in said load is greater on the rear wheels than on the front wheels, and as a result the influence of turning on the steering characteristics will be oversteering.

Similarly, by setting up the distribution ratio for the amplifiers 30 and 31 appropriately, any desired steering characteristics can be obtained when the vehicle is subjecting to a side wind. That is, If $Nf'=Nr'=0.5$ is the setting, the fluctuation in the load acting between the vehicle body and the wheels due to a side wind is distributed evenly between the front and rear wheels, and as a result the influence of the side wind on the steering characteristics will be neutral. If Nf' is set to be greater than Nr', the fluctuation in said load is greater on the front wheels than on the rear wheels, and as a result the influence of the side wind on the steering characteristics will be understeering. If on the contrary Nf' is set to be less than Nr', the fluctuation in said load is greater on the rear wheels than on the front wheels, and as a result the influence of the side wind on the steering characteristics will be oversteering.

According to the mass distribution and the external shape of the vehicle body of individual automobiles Nf, Nr, Nf' and Nr' may be optionally set up to provide certain desirable steering characteristics when the vehicle is running along a curved route and/or in a side wind.

When the vehicle is accelerated, due to the inertia force acting on the vehicle body the load acting between the vehicle body and the front left and right wheels is reduced while the load acting between the vehicle body and the rear left and right wheels is increased, and this produces a squat in the vehicle body.

On the other hand, when the vehicle is decelerated the load acting between the vehicle body and the front left and right wheels is increased while the load acting between the vehicle body and the rear left and right wheels is reduced, and this produces a nosedive in the vehicle body. The fluctuations in the load acting between the vehicle body and the wheels are in both cases substantially proportional to the longitudinal direction acceleration of the vehicle.

In acceleration or forward acceleration of the vehicle the longitudinal direction acceleration detected by the sensor 21 as a negative output b is amplified by the amplifier 36, and inputted as a negative signal $K_5b$ to the servo devices 1fl and 1fr for the front left and right wheels, and as a positive signal $-K_5b$ which has been sign inverted by the sign inverters 37 and 38 to the servo devices 1rl and 1rr for the rear left and right wheels, so the forces exerted by the actuators for the front left and right wheels are reduced while the forces exerted by the actuators for the rear left and right wheels are increased.

In decelerating or rearward acceleration, a positive output b from the sensor 21 is amplified by the amplifier 36, and inputted as a positive signal $K_5b$ to the servo devices 1fl and 1fr for the front left and right wheels and as a negative signal $-K_5b$ which has been sign inverted by the sign inverters 37 and 38 to the servo devices 1rl and 1rr for the rear left and right wheels, so that the forces exerted by the actuators for the front left and right wheels are increased while the forces exerted by the actuators for the rear left and right wheels are decreased.

Although the present invention has been described and illustrated with respect of a particular embodiment thereof, it will be clear to those skilled in the relevant art that various modifications are possible with respect to the shown embodiment within the scope of the present invention.

I claim:

1. A suspension system for a vehicle comprising a vehicle body and a plurality of wheels, comprising:
    a plurality of actuators, each of which supports said vehicle body from a corresponding one of said wheels and is controllable to provide a variable force between said vehicle body and said corresponding wheel;
    a sensor means for detecting acceleration a of said vehicle body in lateral directions thereof and for producing a signal representative thereof;
    a sensor means for detecting roll angle acceleration r of said vehicle body and for producing a signal representative thereof; and
    a control means for inputting said signals representative of said lateral acceleration and said roll angle acceleration of said vehicle body from said sensor means, for calculating based thereupon fluctuation Fs of the load acting between said vehicle body and said wheels due to turning of the vehicle and fluctuation Fw of the load acting between said vehicle body and said wheels due to a side wind blown against the vehicle according to:

$$Fs = K_1a + K_2r$$

$$Fw = -K_3a + K_4r$$

($K_1$, $K_2$, $K_3$ and $K_4$ being positive constants) and for controlling said actuators to increase or decrease forces provided thereby between said vehicle body and said actuators according to the sum of said fluctuations Fs and Fw.

2. A suspension system according to claim 1, wherein said control means controls a pair of front wheels in said plurality of wheels according to the sum of Nf times said fluctuation Fs and Nf' times said fluctuation Fw and a pair of rear wheels in said plurality of wheels according to the sum of Nr times said fluctuation Fw and Nr' times said fluctuation Fw, wherein Nf and Nr are distribution factors for the front wheels and the rear wheels respectively, of said fluctuation Fs of the load acting between said vehicle body and said wheels due to turning of the vehicle with Nf plus Nr being 1.00, and Nf' and Nr' are distribution factors for the front wheels and the rear wheels, respectively, of said fluctuation Fw of the load acting between said vehicle body and said vehicle wheels due to a side wind blown against the vehicle with Nf' plus Nr' being 1.00.

3. A suspension system according to claim 1, further comprising a sensor for detecting acceleration of said vehicle body in longitudinal directions thereof and for producing a signal representative thereof, wherein said control means further inputs said signal representative of said longitudinal direction acceleration and controls said actuators further to vary the forces provided thereby between said vehicle body and a pair of front wheels in said plurality of wheels and to vary the forces provided thereby between said body and a pair of rear wheels in said plurality of wheels, respectively.

4. A suspension system according to claim 3, wherein said control means controls said actuators to increase the forces provided thereby between said vehicle body and said pair of front wheels and to decrease the forces provided thereby between said vehicle body and said pair of rear wheels.

5. A suspension system according to claim 3, wherein said control means controls said actuators to decrease the forces provided thereby between said vehicle body and said pair of front wheels and to increase the forces provided thereby between said vehicle body and said pair of rear wheels.

* * * * *